United States Patent

[11] 3,582,729

[72] Inventors  Roland T. Girard
                Scotia;
                George A. Rice, Schenectady, both of, N.Y.
[21] Appl. No.  862,958
[22] Filed      Oct. 1, 1969
[45] Patented   June 1, 1971
[73] Assignee   General Electric Company

[54] THICK FILM CAPACITORS AND METHOD OF FORMING
     9 Claims, 2 Drawing Figs.
[52] U.S. Cl. ..................................... 317/258,
                    106/39, 117/217, 252/63.2, 29/25.42
[51] Int. Cl. ..................................... H01g 3/06
[50] Field of Search.............................. 317/258;
                    106/39; 117/217; 252/63.2; 29/25.42

[56] References Cited
     UNITED STATES PATENTS
     3,293,077  12/1966  Kaiser .......................... 317/258X Primary Examiner—E. A. Goldberg
Attorneys—Richard R. Brainard, Paul A. Frank, John J. Kissane, Frank L. Neuhauser, Oscar B. Waddell and Joseph B. Forman ABSTRACT: High Q, low dielectric constant thick film capacitors capable of being fired at a temperature below 875° C. are formed from a dielectric mixture of a metal oxide having a melting temperature between 750° C. and 875° C. and at least 30 percent by weight of a niobate, preferably of cadmium, bound together by a glassy binder forming less than 15 percent by weight of the dielectric mixture. When at least two parts by weight barium titanate (or modified barium titanate) are mixed with one part by weight dielectric mixture prior to screen printing, a capacitor is formed having a dielectric constant of approximately 275 and a Q above 250.

Inventors:
Roland T. Girard,
George A. Rice,
by Paul F. Wille
Their Attorney.

THICK FILM CAPACITORS AND METHOD OF FORMING

THICK FILM CAPACITORS AND METHOD OF FORMING

The Disclosure

This invention relates to thick film capacitors and to a method of forming such capacitors. In a more particular aspect, this invention is directed to capacitors characterized by a dielectric containing essentially a crystalline metal oxide having a melting temperature below 875° C. and between 30 percent and 60 percent by weight of a metal niobate bound together by less than 15 percent by weight glass forming oxides. The high concentration of the crystalline metal oxide assists in binding the dielectric during firing at temperatures below 875° C. without detracting from the electrical characteristics of the niobate forming substantially the remainder of the dielectric.

In recent years, screen printing of electrical components has been increasingly utilized to mass produce low cost consumer items. Screen printing of capacitors however heretofore has been limited because the high firing temperature, e.g. above 1,000° C., required to coalesce screen printed particles into a cohesive structure with the juxtaposed electrodes necessitates the utilization of relatively expensive electrode metals, such as platinum. For example, capacitor dielectrics formed of finely divided ferroelectric crystalline compounds, e.g. barium titanate and/or various niobates either alone or in mixture with a titanate, zirconate or stannate, bound by very small amounts of siliceous or argillaceous bonding material generally require firing at a temperature in excess of 1100° C. for proper maturing thereby necessitating platinum or palladium platinum electrodes to withstand the firing temperature. It also has been proposed, e.g. in U.S. Pat. Ser. No. 3,195,030, that capacitors having a dielectric formed by smelting a mixture comprising 30—90 cationic mol percent barium titanate and at least one glass forming oxide need be fired only between 850° C. and 1150° C. to crystallize the barium titanate. Although these capacitors exhibit advantageous properties, much higher temperatures are required to form the capacitors and the capacitors could not be made by screen printing and firing at low temperatures.

It is therefore an object of this invention to provide a thick film capacitor having a novel dielectric capable of being fired at temperatures below 875° C.

It is also an object of this invention to provide a thick film capacitor dielectric characterized by a dielectric constant between 10 and 60 and a low dissipation factor.

It is a further object of this invention to provide a thick film, intermediate dielectric constant capacitor having excellent electrical characteristics.

It is also an object of this invention to provide a method of forming an inexpensive thick film capacitor having good electrical characteristics.

These and other objects of this invention generally are achieved in a capacitor having two conductive electrodes and an intermediate dielectric containing less than 15 percent by weight of a glass forming oxide to serve as a low temperature binder for a crystalline mixture of a metal oxide having a firing temperature between 750° C. and 875° C. and a niobate of a metal selected from the group consisting of cadmium potassium, tantalum, strontium, lead and mixtures thereof. To produce capacitors having a low dissipation factor and low dielectric constant, the niobate should form between 30 percent and 70 percent by weight of the dielectric with the metal oxide being present in quantities between 15 percent and 45 percent by weight of the dielectric to complete the dielectric mixture. For capacitors having a dissipation factor below 0.4 percent and a dielectric constant above 200, barium titanate particles can be mixed with the dielectric subsequent to smelting of the dielectric mixture. A more complete understanding of the present invention may be obtained by considering the following detailed description in conjunction with the accompanying drawing in which:

Figure 1:
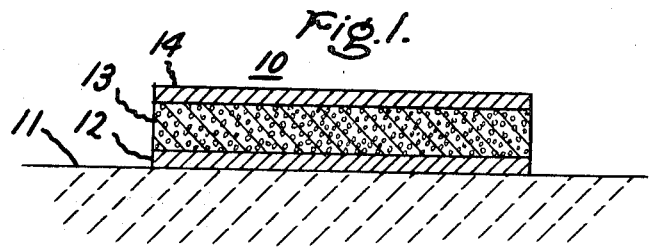
FIG. 1 illustrates a cross-sectioned view of a capacitor in accordance with the present invention.
Figure 2:
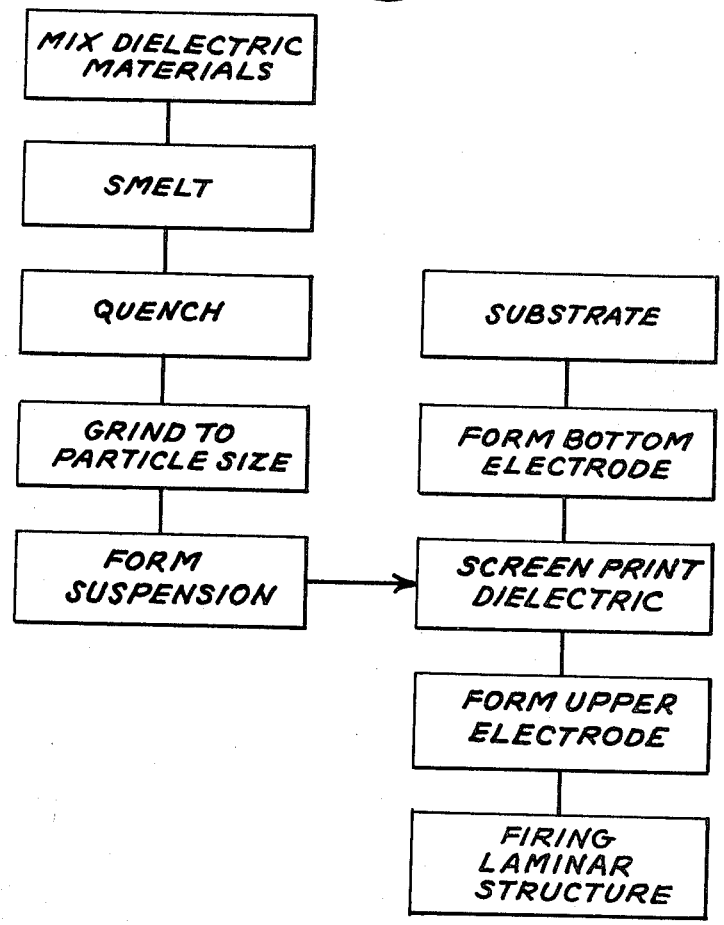
FIG. 2 illustrates a flow diagram of the making of capacitors in accordance with the present invention.

As illustrated in FIG. 1, a capacitor 10 is formed atop an alumina substrate 11 and comprises a conductive electrode 12, which may for example comprise palladium-silver, having dielectric layer 13 printed thereon. Covering dielectric layer 13 is counterelectrode 14. The constituent parts and formation of dielectric layer 13 is more fully described below in connection with FIG. 2.

In a more specific aspect, the niobate serves to produce the low dissipation factor and desired electric constant in the capacitor and preferably is present in high concentrations, e.g. 15—45 percent by weight of the dielectric mixture. To form a permanent crystal phase of the niobate when smelted at 1275°—1300° C., a metal oxide such as cadmium also is included in the dielectric mixture in approximately equal molar ratios with the niobate to assure a complete reaction of the metal oxide with the niobate during smelting. Although crystalline cadmium niobate also can be added to the dielectric mixture subsequent to smelting (as will be more fully explained hereinafter), capacitors having lower dissipation factors and lower dielectric constants are obtained by adding the niobate to the dielectric mixture prior to smelting. In general, the cadmium niobate crystals formed during smelting comprise at least 30 percent by weight of the dielectric mixture to produce the desired electrical characteristics therein while cadmium niobate concentrations greater than 60 percent by weight of the dielectric mixture generally results in a refractory mixture negating firing at temperatures below 875° C. If desired, other metal oxides, e.g. lead oxide, potassium oxide, tantalum oxide or strontium oxide, can be substituted for some or all of the cadmium oxide utilized in forming the metal niobate crystals of the dielectric, although cadmium oxide and lead oxide generally are preferred. When lead oxide is employed as one of the constituents forming the glassy binder of the dielectric, the weight percentage of the niobate in the dielectric mixture should be slightly, e.g. 2 percent by weight, in excess of the cadmium oxide concentration to have some residual niobate for reaction with any portion of the lead oxide not forming the glass binder.

To assist in firing the dielectric at temperatures below 850° C., a large concentration of a metal oxide, e.g. bismuth oxide, having a melting point between 750° C. and 875° C. is added to the dielectric mixture to form a second crystalline phase in the smelted dielectric mixture. Desirably, the bismuth oxide forms between 15 percent and 45 percent by weight of the dielectric mixture and because relatively no other ingredients are present in the dielectric mixture to react with the bismuth oxide, a large residue of unreacted bismuth oxide is retained after smelting. Although a minimal quantity of bismuth oxide may go into the formation of the glassy binder, a good portion of the bismuth oxide is in solid solution with the niobate and, upon subsequent firing of the capacitor at 875° C., the bismuth oxide melts at approximately 820° C. to assist in binding the screen printed dielectric particles to the capacitor electrodes. Other metal oxides, such as lead oxide, having a melting temperature between 750° C. and 875° C. also may be utilized to bind the dielectric to the electrodes at firing temperatures below 875° C.

The remainder of the dielectric mixture is composed of glass forming ingredients to provide a minimal quantity, e.g. less than 15 percent by weight, of a glassy binder for bonding the bismuth oxide and cadmium niobate particles of the dielectric at temperatures between approximately 500° C. and 830° C. Suitably the glassy binder can be formed by the reaction of lead oxide, boron oxide, and silicon dioxide during an initial smelting of the dielectric mixture at a temperature of between 1275° C. and 1300° C. with the silicon dioxide serving to form a eutectic with lead oxide and boron oxide. The glassy binder therefore forms a separate, small phase of the melt during the initial smelting with the bismuth oxide and cadmium niobate forming separate molten phases therewith.

To inhibit recrystallization of the glassy binder upon cooling of the melt, the melt is quenched rapidly, e.g. from 1300° C. to 600° C. within approximately 15 seconds, and subsequently ground to a particle size suitable for screen printing. Because the glassy binder adversely affects the electrical characteristics of the capacitor, the quantity of binder should be the minimum required, e.g. less than 5 percent by volume, for bonding the niobate and bismuth oxide crystals at temperatures below approximately 820° C. during firing of the capacitor.

An additional lowering of the firing temperature of the dielectric can be achieved by the inclusion of a small percentage, e.g. less than 4 percent by weight, of sodium fluoride to the dielectric composition. The sodium fluoride reacts with the lead oxide, boron oxide and silicon dioxide forming the glassy binder to lower the melting temperature of the glassy binder although a small portion of the sodium fluoride advantageously can react with the niobate to form another crystal phase of the niobate around the cadmium niobate. If desired, calcium fluoride or calcium oxide may be substituted for the sodium fluoride without a significant change in the desired low melting temperature of the glassy binder.

More particularly, a high Q capacitor dielectric in accordance with this invention generally can be fabricated by smelting the following thoroughly mixed constituents for 1 hour in a platinum crucible at a temperature between 1275° and 1300° C.:

| | |
|---|---|
| PbO | 3 percent—7 percent by wt. |
| $B_2O_3$ | 1 percent—5 percent by wt. |
| $Bi_2O_3$ | 10 percent—40 percent by wt. |
| $SiO_2$ | 3 percent—15 percent by wt. |
| CdO | 18 percent—30 percent by wt. |
| $Nb_2O_5$ | 18 percent—30 percent by wt. |
| NaF | 0 percent—4 percent by wt. |

The smelting produces a liquid having a glassy phase formed by the interaction of the sodium fluoride, silicon dioxide, boron oxide, and lead oxide, a liquid cadmium 500° C. 800° C. niobate phase produced by the interaction of the cadmium oxide and the niobium pentoxide, and a liquid bismuth oxide phase produced by the excess bismuth concentration in the smelted dielectric mixture. After smelting, the melt is rapidly quenched on a steel plate to permit retention of a small quantity of the glassy phase to assist in bonding the dielectric at temperatures between 500° C. and 800° C. during subsequent firing of the capacitor.

The cooled melt then is ground to a particle size suitable for screen printing, e.g. 1—2 microns, and suspended within a suitable vehicle for screen printing. One particularly advantageous vehicle for this purpose is a mixture of pine oil and ethyl cellulose in the proportions of 8 grams cellulose to 60 cc. of pine oil with good screen printing being obtained employing 30 grams of the ground dielectric in 12.9 grams of the ethyl cellulose-pine oil mixture. The capacitor dielectric then is screen printed atop a suitable conductive electrode, e.g. a platinum-gold electrode previously screen printed atop an alumina substrate and fired at a temperature between 760° C. and 860° C., whereupon a counterelectrode of platinum-gold is screen printed atop the dielectric. The capacitor then is fired at a temperature between 760° C. and 875° C. to coalesce the screen printed dielectric and fixedly attach the counterelectrode thereto. The capacitor formed characteristically exhibits a dissipation factor below 0.5 percent with a dielectric constant of less than 100 and possesses an essentially zero thermal sensitivity in a temperature range between 0° C. and 125° C.

A particularly preferred dielectric in accordance with this invention is obtained by smelting the following mixture for one hour at 1300° C.:

| | |
|---|---|
| PbO | 4.25 percent by wt. |
| $B_2O_3$ | 1.34 percent by wt. |
| $Bi_2O_3$ | 41.70 percent by wt. |
| $SiO_2$ | 5.21 percent by wt. |
| CdO | 22.80 percent by wt. |
| $Nb_2O_5$ | 23.60 percent by wt. |
| NaF | 0.95 percent by wt. |

After smelting, the melt is quickly quenched to retain the glassy phase present in the melt, ground to a particle size of 1—2 microns and suspended in a vehicle formed by the mixture of 8 grams ethyl cellulose with 60cc of pine oil in a ratio of 30 grams ground dielectric to 12.9 grams of vehicle. The ground dielectric then is deposited atop a palladium-silver electrode previously screen printed atop an alumina substrate and fired at a temperature between 750° C. and 900° C. whereupon a palladium-silver counterelectrode is screen printed atop the dielectric and the capacitor thus formed is fired at approximately 800° C. for 10—12 minutes The capacitor exhibits a dissipation factor below 0.2 percent and is characterized by a dielectric constant of approximately 35 and a stable electrical response over a temperature range between 0° C. and 125° C.

Similarly capacitors in accordance with this invention having a dielectric constant of 27 and a dissipation factor of 0.25 percent were obtained by smelting at 1300° C. for 1 hour the following thoroughly mixed composition:

| Materials | Percent By Weight |
|---|---|
| PbO | 3.6 |
| $B_2O_3$ | 1.1 |
| $Bi_2O_3$ | 34.8 |
| $SiO_2$ | 4.4 |
| NaF | 4.4 C |
| CdO | 25.5 |
| $Nb_2O_5$ | 26.2 |

The melt is quickly quenched to retain the glassy binder, ground to a particle size of 1—2 microns and suspended in a vehicle of pine oil and ethyl cellulose for screen printing atop a platinum-gold electrode on an alumina substrate. A platinum-gold counterelectrode then is deposited atop the dielectric and the structure is fired at 800° C. for 10—12 minutes to mature the dielectric.

Although cadmium oxide and niobium pentoxide preferably are added to the dielectric mixture prior to smelting at 1300° C. to form cadmium niobate, i.e. $2 CdO \cdot Nb_2O_5$, cadmium niobate crystals also can be formed separately from the dielectric and added to the dielectric mixture subsequent to smelting. For example, a capacitor may be formed by smelting the following thoroughly mixed ingredients at 1300° C. for 1 hour:

| | |
|---|---|
| PbO | 2.4 percent by wt. |
| $B_2O_3 \cdot 3H_2O$ | 1.3 percent by wt. |
| $Bi_2O_3$ | 22.9 percent by wt. |
| $SiO_2$ | 2.9 percent by wt. |
| NaF | 0.5 percent by wt. |

The smelt then is rapidly cooled, ground to 1-2 micron particle size and mixed with 1-2 micron cadmium niobate particles in a ratio of 30 percent smelt to 70 percent cadmium niobate whereupon the particulate mixture is suspended in a suitable vehicle for screen printing and deposited atop platinum-gold electrode. A platinum-gold counterelectrode then is deposited atop the dielectric and the structure is fired at 800° C. for 10—12 minutes to form a capacitor having a dissipation factor of 0.5 percent and a dielectric factor of approximately 50. Because the cadmium oxide and the niobium pentoxide are not present in the smelted mixture, the weight percentage of these materials in the dielectric can be increased, e.g. to 70 percent by weight of the mixture, relative to a dielectric containing cadmium niobate formed by smelting a dielectric mixture containing cadmium oxide and niobium pentoxide. When the cadmium niobate is formed in the smelt, the cadmium oxide and niobium pentoxide forming the cadmium niobate cumulatively may not exceed approximately 55 percent by weight of the smelted dielectric mixture without adversely affecting the firing temperature required for maturing the dielectric. Failure to form the niobate in the smelt, however, generally has been found to increase the dissipation factor of the resulting capacitor.

Although sodium fluoride advantageously is included in the capacitor dielectric to lower the melting point of the glassy binder produced during smelting of the mixture, capacitors characterized by a low dielectric constant and low dissipation factor also can be formed in accordance with this invention without sodium fluoride as is exemplified by a capacitor formed of the following ingredients:

| | |
|---|---|
| PbO | 4.3 percent by weight |
| $B_2O_3$ | 2.4 percent by weight |
| Bio | 41.6 by weight |
| SiO | 5.3 percent by weight |
| CdO | 22.8 percent by weight |
| $Nb_2O_5$ | 23.6 percent by weight |

The ingredients are thoroughly mixed and smelted at a temperature of approximately 1300° C. for 1 hour whereupon the melt is quickly quenched to a solid state and ground to a particle size suitable for screen printing. Upon suspension of the particles in a suitable vehicle, the capacitor dielectric screen is printed atop a platinum-gold electrode previously deposited atop an alumina substrate and fired at 750° C. A platinum-gold counterelectrode then is deposited atop the capacitor dielectric and the structure is fired for 10—12 minutes at a temperature between 750° C. and 800° C. to form a capacitor having a dissipation factor slightly in excess of 0.2 percent and a dielectric constant of approximately 40.

When lower dielectric constants are desired, the ground dielectric of this invention can be mixed with 5 percent—20 percent by weight of a crystalline additive, e.g. aluminum oxide, magnesium oxide, zirconium oxide, a metal silicate or mixtures of the foregoing crystalline additives, during preparation of the ink utilized for screen printing the capacitor dielectric. Although these crystalline additives are inert when added to the ink subsequent to smelting, the crystalline additives may adversely affect the dissipation factor of the capacitor if included in the melt subjected to smelting at temperatures in excess of 1200° C. The inert additives also advantageously can be employed to alter the thermal coefficient of expansion of the dielectric to a value comparable to the thermal coefficient of expansion of the substrate upon which the capacitor is formed. For example, although the dielectric of this invention without the crystalline additives exhibits a thermal coefficient of expansion highly suitable for capacitors deposited upon alumina substrates, the addition of a metal silicate or magnesium oxide to the ground dielectric increases the thermal coefficient of expansion of the dielectric to a value suitable for substrates, e.g. enameled steel substrates, having a relatively higher thermal coefficient of expansion. Similarly when the capacitor substrate is a material, e.g. porcelain, exhibiting a relatively low thermal coefficient of expansion, aluminum oxide or mullite, i.e. $3Al_2O_3 \cdot 2SiO_2$, advantageously is added to the ground dielectric prior to screen printing for thermal expansion purposes.

To form an intermediate Q capacitor having a dissipation factor below 0.5 percent and a dielectric constant above 200, a high dielectric constant crystal material such as barium titanate or modified barium titanate, e.g. barium titanate modified with lanthanum oxide, niobium oxide, neodynium oxide, strontium stannate, etc., is added in crystalline form to the ground dielectric during formation of the ink for screen printing. In general, the quantity of high dielectric constant crystal material added to the dielectric is dependent upon the dissipation factor and dielectric constant desired for the capacitor, e.g. a mixture of 70 percent by weight barium titanate with 30 percent by weight ground dielectric produces a capacitor having a dielectric constant of approximately 200—300 and a dissipation factor below 1 percent while capacitors having a dielectric constant in excess of 100 and dissipation factors below 1 percent can be obtained by mixing 15 percent by weight of the ground dielectric of this invention with 85 percent by weight of a mixture consisting of 95 percent by weight $BaTiO_3$ and 5 percent by weight $PbNb_2O_5$. For capacitors having a dielectric constant above 100, the high dielectric constant crystal material should be mixed with the ground dielectric of this invention in a ratio in excess of two parts crystal material to one part ground dielectric during formation of the ink for screen printing the capacitor dielectric. Because the dielectric constant of the dielectric of this invention is at least three-fold the dielectric constant of borosilicate glasses conventionally employed as a binder for barium titanate crystals, the dielectric constant of the barium titanate is relatively undiluted when the dielectric of this invention is employed as a binder for barium titanate crystals.

THICK FILM CAPACITORS AND METHOD OF FORMING

What we claim as new and desire to secure by Letters Patent of the United States is:

1. A capacitor having two conductive electrodes and an intermediate dielectric containing less than 15 percent by weight of glass forming oxides to serve as a low temperature bonding agent for the dielectric, the remainder of said mixture consisting of a dielectric crystalline metal oxide forming between 15 percent and 45 percent by weight of the mixture and a niobate of a metal selected from the group consisting of niobium, potassium, tantalum, strontium and lead, and niobate forming between 30 percent and 60 percent by weight of the dielectric.

2. A capacitor dielectric according to claim 1 further including an inert filler selected from the group consisting of aluminum oxide, magnesium oxide, zirconium oxide, a metal silicate and mixtures thereof.

3. A capacitor having two conductive electrodes and an intermediate dielectric comprising:

| | |
|---|---|
| PbO | 3 percent—7 percent by wt. |
| $B_2O_3$ | 1 percent—5 percent by wt. |
| $Bi_2O_3$ | 10 percent—40 percent by wt. |
| $SiO_2$ | 3 percent—15 percent by wt. |
| CdO | 18 percent—30 percent by wt. |
| $Nb_2O_5$ | 18 percent—30 percent by wt. |
| NaF | 0 percent—2 percent by wt. |

4. A capacitor according to claim 3 wherein said dielectric includes an inert filler selected from the group consisting of aluminum oxide, magnesium oxide, zirconium oxide, a metal silicate and mixtures thereof.

5. A capacitor according to claim 3 wherein said dielectric is mixed with crystalline barium titanate in a ratio of at least two parts by weight barium titanate to one part by weight dielectric.

6. A capacitor according to claim 5 wherein said barium titanate is modified with a material selected from the group consisting of barium stannate, niobium oxide, neodynium oxide and mixtures thereof.

7. A capacitor according to claim 3 wherein said electrode is formed atop an alumina substrate.

8. A method of forming the capacitor of claim 3 comprising smelting the dielectric mixture of claim 3 at a temperature between 1150° C. and 1300° C. to form a melt, rapidly quenching said melt to retain a glassy component in the cooled dielectric mixture, grinding said cooled dielectric mixture to a dimension suitable for screen printing, screen printing said ground dielectric mixture atop one said conductive substrate, depositing said second conductive substrate atop said dielectric mixture to form a laminar structure and firing said laminar structure at a temperature between 750° and 900° C.

9. A method of forming a capacitor according to claim 8 further including mixing a compound selected from the group consisting of barium titanate and modifications of barium titanate with a material selected from the group consisting of lanthanum oxide, niobium oxide, neodynium oxide, strontium stannate and mixtures thereof into said ground dielectric mixture prior to screen printing said dielectric mixture atop said conductive substrate.